M. LEWLESS.
THERMOSTATIC PRESSURE VALVE.
APPLICATION FILED JAN. 28, 1914.
1,103,787.
Patented July 14, 1914.
2 SHEETS—SHEET 1.
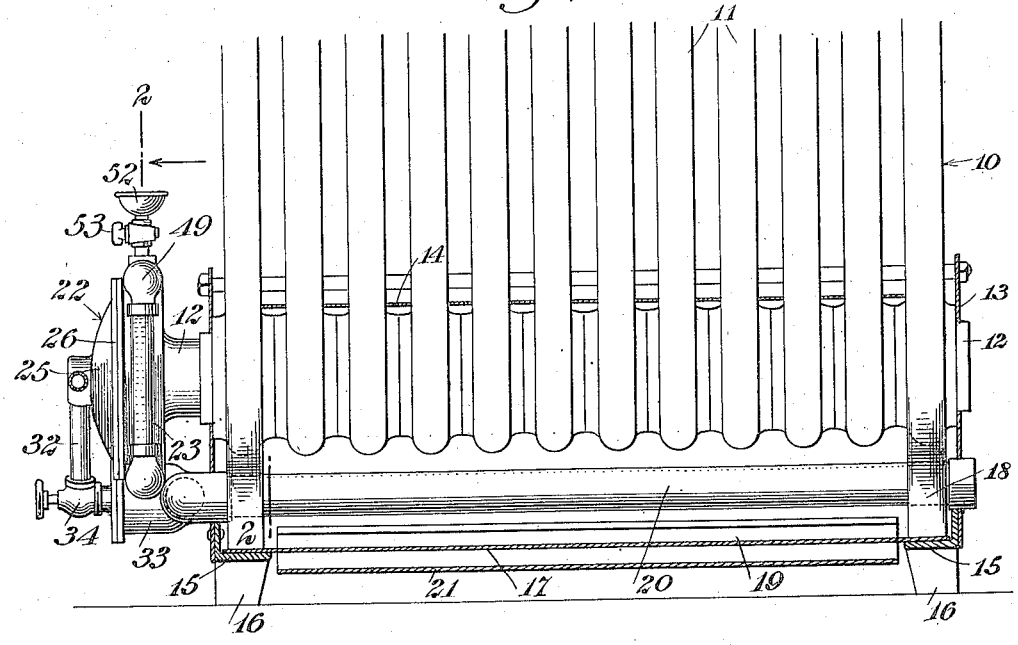
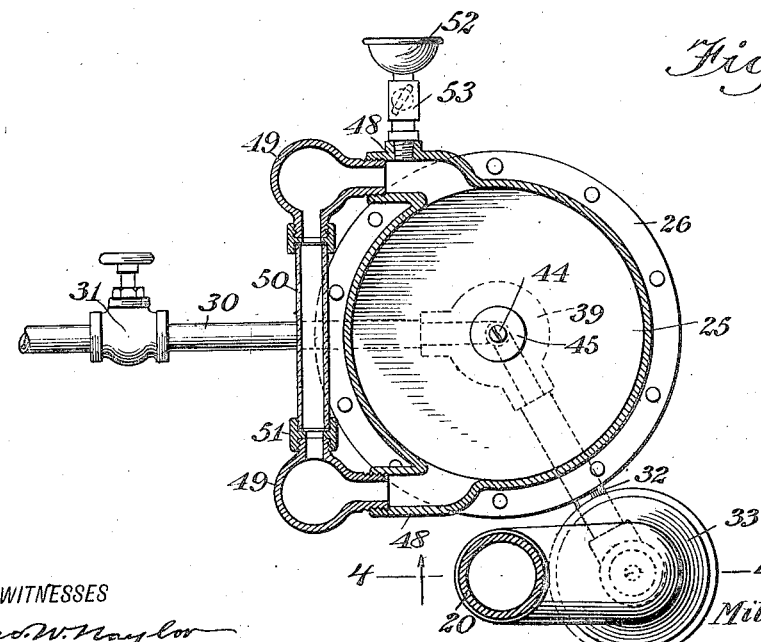
INVENTOR
Mildred Lewless
BY Munn & Co.
ATTORNEYS
WITNESSES
Geo. W. Naylor
J. Elwin Burch M. LEWLESS.
THERMOSTATIC PRESSURE VALVE.
APPLICATION FILED JAN. 28, 1914.
1,103,787.
Patented July 14, 1914.
2 SHEETS—SHEET 2.
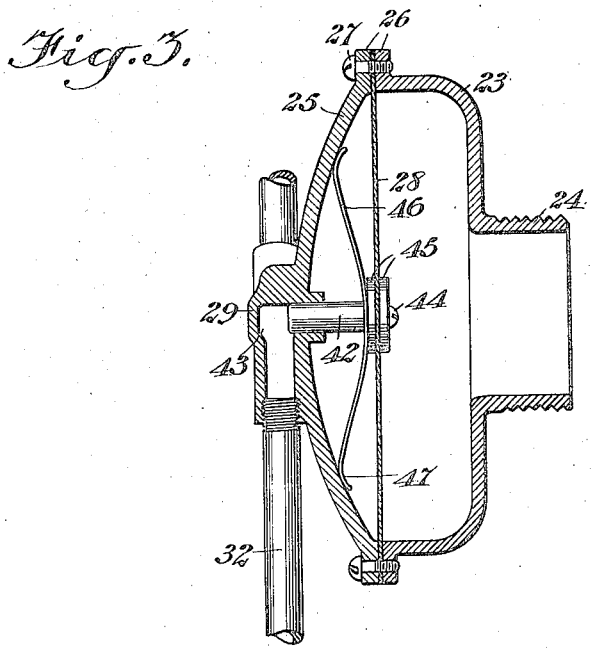
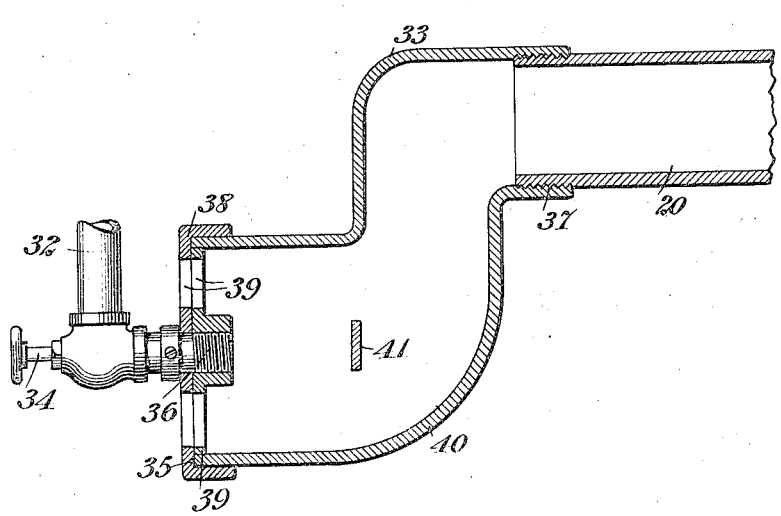
WITNESSES
INVENTOR
Mildred Lewless
BY
ATTORNEYS

UNITED STATES PATENT OFFICE.

MILDRED LEWLESS, OF NEW YORK, N. Y.

THERMOSTATIC PRESSURE-VALVE.

1,103,787.  Specification of Letters Patent.  Patented July 14, 1914.

Application filed January 28, 1914. Serial No. 814,926.

*To all whom it may concern:*

Be it known that I, MILDRED LEWLESS, a citizen of the United States, and a resident of the city of New York, borough of Brooklyn, in the county of Kings and State of New York, have invented a new and Improved Thermostatic Pressure-Valve, of which the following is a full, clear, and exact description.

This invention has special reference to a new and improved thermostatic or pressure valve adapted for particular use in connection with a portable radiator heater, although it is here explained that the valve is designed for use with other heating systems or storage devices wherein it is preferable or necessary to automatically cut off a supply of fluid matter, and in the present instance to cut off the supply of fuel to a burner for the heater.

Another object of the invention is to provide a compact and thoroughly reliable automatically operating valve which is particularly adapted for operation under increasing pressure due to the increase in the temperature of a body of water contained in the radiator so that the supply of gas or other fuel to the burner of a portable radiator heater may be automatically regulated to maintain the water at a uniform temperature and to maintain a uniform generation of steam, while means are also provided for facilitating the filling of the radiator for determining the height of the water therein.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views, and in which—

Figure 1 is a top elevation of the improved valve connected to a radiator and heater therefor; Fig. 2 is a vertical sectional view taken on the line 2—2 of Fig. 1 and looking in the direction indicated by the arrow; Fig. 3 is a sectional view taken centrally at right angles to Fig. 2; and Fig. 4 is a horizontal sectional view taken on the line 4—4 of Fig. 2 and looking in the direction indicated by the arrow.

In the illustrated embodiment of the invention the numeral 10 indicates a radiator which comprises a plurality of sections 11 adapted to contain water and communicating through a common connecting pipe 12 through which the water is supplied to the several sections composing the radiator by a local or other system of supply. In the use of the device the lower portion of the radiator is inclosed by a casing 13 having portions 14 fitting between the sections so as to prevent the escape of the heat generated beneath the radiator and thereby secure a maximum heating of the water contained in the radiator. The specific construction of this casing or portable radiator base forms the subject matter of a co-pending application and further consists of angular pieces 15 having integral or attached feet 16 by which the casing is supported in spaced relation to the floor. A bottom 17 is supported upon the angular pieces and the legs 18 of the radiator, which snugly fits within the casing, rest on the bottom in such supported position. By means of upturned portions 19 openings are provided at either side of the bottom 17 so as to allow the escape of air into the combustion chamber beneath the radiator in which a burner 20 shown in the form of a tubular apertured member supported in apertures in the ends of the casing, is provided. An auxiliary bottom 21 is supported at a spaced distance from the main bottom to provide an air space so as to prevent undue heating of the floor.

The present device connects with the usual pipe 12 so as to be automatically actuated due to increased pressure caused by the expansion of the water in the radiator, or vice versa, and comprises a relatively flat valve casing 22 formed of a section 23 having a threaded attaching extension 24 extending laterally therefrom for attachment to the pipe 12 whereby communication is established with the interior of the valve casing. The other section of the valve casing is indicated by the numeral 25 and both casing sections are provided with apertured flanges 26 removably connected as shown at 27, whereby a flexible diaphragm 28 may be mounted between the sections and readily renewed when necessary. Carried by the section 25 of the valve casing and preferably formed integrally therewith is an auxiliary valve casing 29 which is connected horizontally with an inlet or supply pipe 30 for suitable fuel such as gas, the supply being regulated by means of a valve 31.

It is here explained that kerosene, gasolene or any other kind of fuel may be substituted for gas which has been designated, but such fuel is discharged through an outlet pipe 32 which leads to an annular mixing chamber 33 supported in horizontal alinement with the burner through one end of the casing. A needle valve 34 is provided to control the supply of fuel exuding from the pipe 32 into the mixing chamber 33. The valve 34 is removably mounted in the end wall 35 of the mixing chamber 33, as shown at 36, so as to permit the parts to be assembled or disassembled conveniently, and this object is further carried out by the removable attachment of the mixing chamber 33 to the burner pipe 20, as shown at 37. An apertured regulating cap 38 is movably mounted on the extremity of the mixing chamber 33, the co-acting openings 39 in the end wall of the mixing chamber and the cap permitting the proper regulation of the air supply to mix with the gas or fuel which, when it strikes the curved wall 40, will be given a whirling motion so as to cause the thorough carbonization thereof in such a manner as to produce a greater heat for a predetermined quantity of fuel. A deflecting strip 41 traverses the casing of the mixing chamber vertically for contact by the discharge of fuel so as to insure thorough atomization and carbonization in addition to the angular formation of the mixing chamber, the fuel finally escaping in the form of gas through the burner openings.

In order to control the quantity of fuel or gas supplied to the burner when the valves 31 and 34 are properly regulated through the use of the device, a cylindrical valve 42 is provided, the same operating through the casing section 25 and loosely fitting a valve seat 43 in the auxiliary valve casing 29 and being removably connected to the diaphragm 28 by means of a fastening screw 44. This fastening screw passes through the diaphragm and into the valve 42 while plates or washers 45 are mounted on either side of the diaphragm to prevent destruction of the latter and to form a better anchor for the attaching means for securing the valve to the diaphragm. A leaf spring 46 is mounted between one of the washers 45 and the valve and has its curved free ends 47 contacting with the inner face of the casing section 25 so as to normally open the valve 42 and cause the diaphragm to assume the position shown in Fig. 3 of the drawings when relieved of excessive pressure. The valve casing proper has leading from its section 23 upper and lower horizontal extensions 48 terminating in globular portions 49 to oppositely extended threaded portions of which a glass gage 50 is removably coupled, as shown at 51, so as to permit the determination of the height of the water in the radiator or reservoir to which the device is attached. A filling cup 52 connects with the upper extension for the purpose of supplying the water to the radiator through the pipe 12, the connection being capable of being opened and closed by means of a valve 53.

In the normal position the valve 42 is open and the diaphragm 28 is straight or positioned on a common plane, and water having been supplied to the radiator the valves 31 and 34 are adjusted to permit the proper escape of fuel or gas to the burner. The burner being ignited the water in the radiator is heated and when heated to a certain degree, or when steam is generated, the pressure created due to the expansion of the water will tend to move the valve toward its seat 43 by flexing the diaphragm 28 outwardly against the action of the spring 46. Should the pressure be excessive and thereby necessitate a decrease in the fuel supply, when the valve is moved outwardly toward its seat 43 the gas will be permitted to slowly escape to the burner, and since the valve 42 loosely fits its seat the gas will not be entirely cut off but the flame will be reduced sufficient to permit further excessive heating of the water or generation of steam, and in this manner a uniform temperature will be retained in the room or rooms which are heated.

Having thus described my invention, what I claim as new and desire to secure by Letters Patent is:—

1. In a pressure valve, the combination with a reservoir adapted to contain water under pressure and having a water supply connection and a threaded opening near its lower portion; of a diaphragm casing comprising two sections secured together, a diaphragm held between said sections and disposed normally rectilinear, one section having a reduced threaded extension for engagement with the threaded portion of the reservoir, the other section of the diaphragm casing having an angular fitting integral therewith and provided with a valve seat, a valve connected to the diaphragm at the central portion thereof and operating through said diaphragm section to coöperate with the valve seat and regulate the size of the passage therethrough, a supply pipe connected with one end of said angular fitting, and a burner communicating with the other connection and receiving a supply of fuel therethrough for the heating of the water in the reservoir, variation in the internal pressure in the reservoir due to the heating of the water at various temperatures serving to close or open the valve by varying pressures on the diaphragm.

2. A thermostatic valve comprising a casing, a diaphragm in the casing, said casing having an opening with an extension adapted for attachment to a radiator, an auxiliary valve integral with the casing and having a seat, a cylindrical valve connected to the diaphragm and operating through the casing to separate the interior of the diaphragm from the auxiliary valve, a spring normally maintaining the diaphragm rectilinear and the valve unseated, said valve carried by the diaphragm loosely coöperating with said seat to partly cut off the supply when seated, a supply pipe for fuel communicating with the auxiliary valve, a burner to heat the water in the radiator, an outlet pipe also communicating with said auxiliary valve and with the burner, said valve being shifted by the flexing of the diaphragm under excessive pressure to restrict the flow of fuel to the supply pipe, and a gage glass having a filling member for supplying water to the radiator.

In testimony whereof I have signed my name to this specification in the presence of two subscribing witnesses.

MILDRED LEWLESS.

Witnesses:
 LOUIS SCHAEFER,
 JOHN J. McGOIRRU.